United States Patent [19]
Shin

[11] Patent Number: 5,858,220
[45] Date of Patent: Jan. 12, 1999

[54] FILTER FOR A WASHING MACHINE

[75] Inventor: Jung-soo Shin, Suwon-city, Rep. of Korea

[73] Assignee: Samsung Electronics Co., Ltd., Suwon-City, Rep. of Korea

[21] Appl. No.: 28,522

[22] Filed: Feb. 24, 1998

[30] Foreign Application Priority Data

Aug. 16, 1997 [KR] Rep. of Korea ........................ 97-39042
Aug. 16, 1997 [KR] Rep. of Korea ........................ 97-39045

[51] Int. Cl.$^6$ ........................... D06F 39/10; B01D 29/35; B01D 35/153; B01D 35/22
[52] U.S. Cl. ........................... 210/167; 210/238; 210/136; 210/346; 210/196; 68/18 F
[58] Field of Search ................................... 210/136, 238, 210/346, 167, 196; 68/18 F

[56] References Cited

U.S. PATENT DOCUMENTS

| | | |
|---|---|---|
| 2,939,305 | 6/1960 | Snyder . |
| 3,626,728 | 12/1971 | Traube . |
| 5,509,283 | 4/1996 | Lee . |
| 5,661,989 | 9/1997 | Jeon . |

FOREIGN PATENT DOCUMENTS

| | | |
|---|---|---|
| 62-14896 | 1/1987 | Japan . |
| 1-230394 | 9/1989 | Japan . |
| 3-103296 | 4/1991 | Japan . |
| 4-285595 | 10/1992 | Japan . |

*Primary Examiner*—Thomas M. Lithgow
*Attorney, Agent, or Firm*—Burns, Doane, Swecker & Mathis, L.L.P.

[57] ABSTRACT

A filter for a washing machine is disclosed. The filter includes a pocket type filter which filters fluff intermingled in washing water and has a front panel. The front panel is provided with a mesh net abutted to an inner surface of reinforcement member of the front panel. In addition, a filter case receives the pocket type filter therein and is provided with a washing water accelerating part at lower rear side. The washing water accelerating part gradually decreases the sectional area of the space defined by the filter case and a dehydrating tub so that the washing water is accelerated and introduced into the interior of the pocket type filter. The fluff attached to the mesh net is prevented the washing water to be easily flew so that the efficiencies of the filter and a washing machine are enhanced.

3 Claims, 6 Drawing Sheets

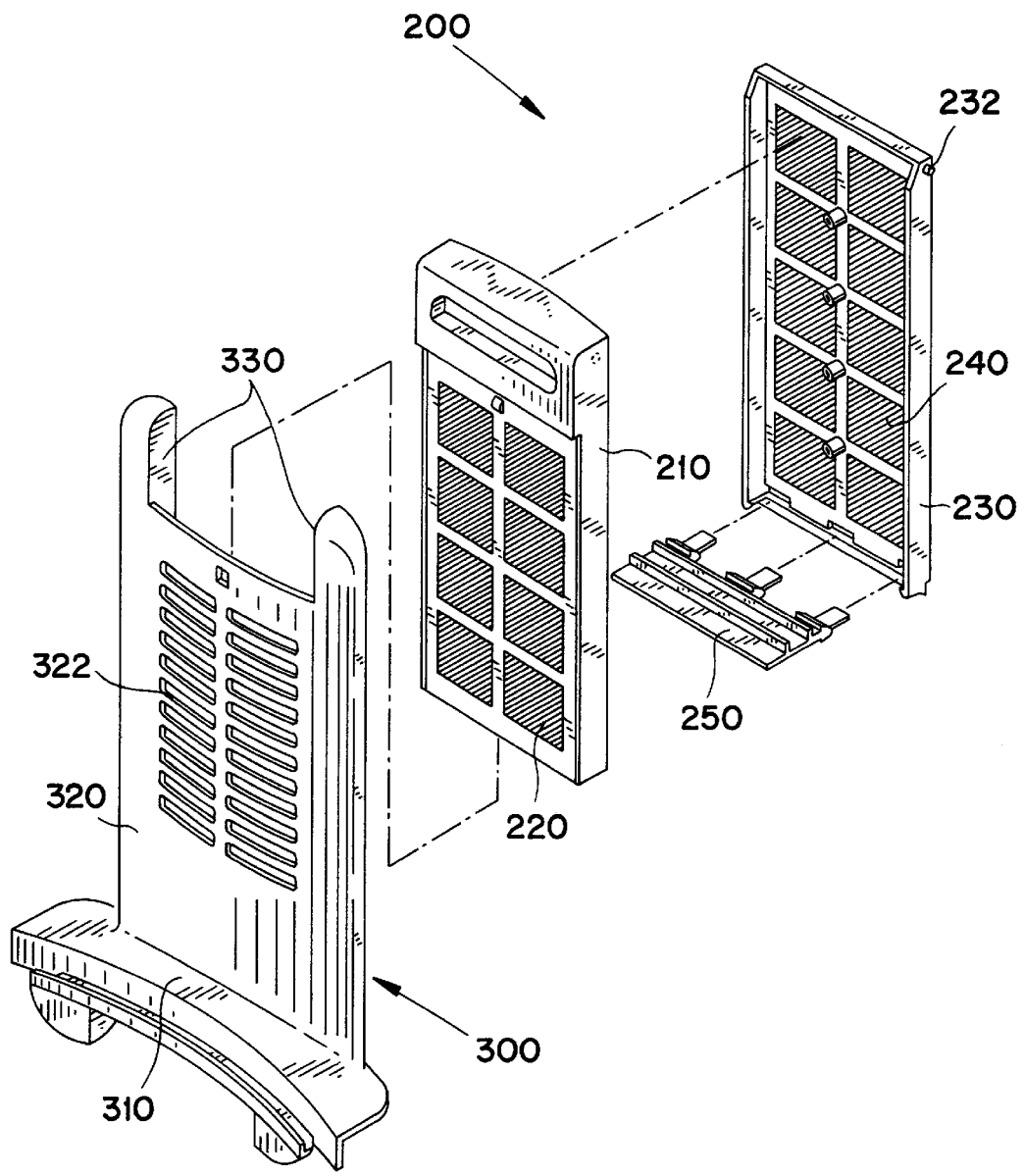

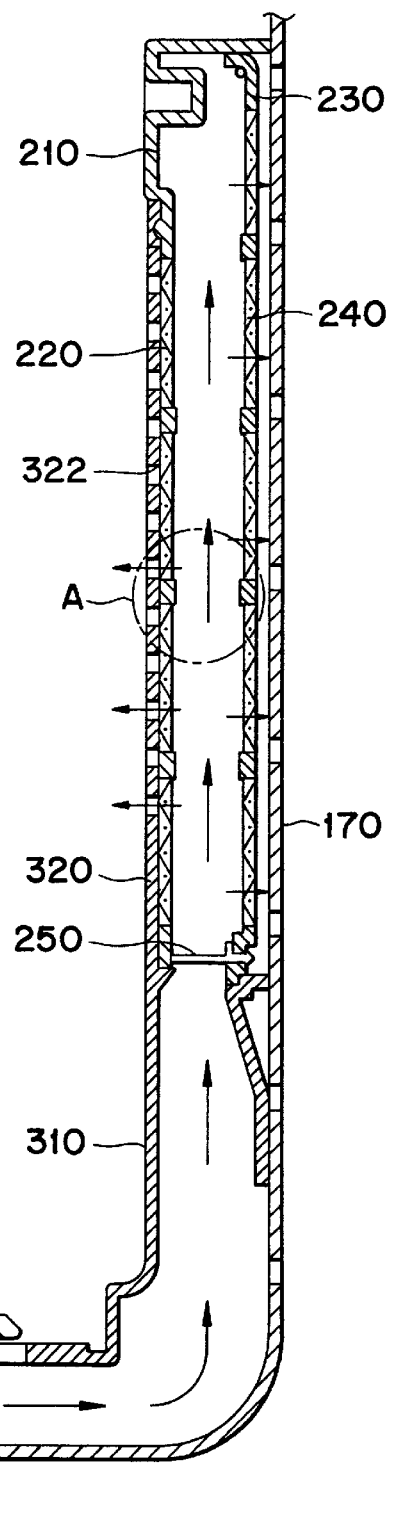
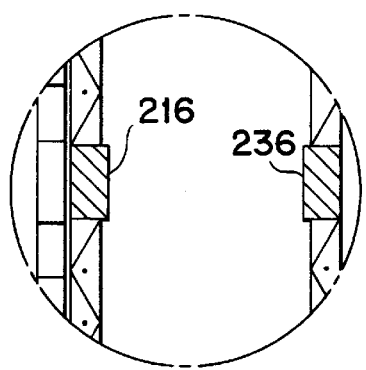
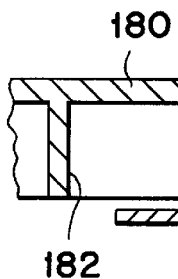
FIG. 4A
PRIOR ART
FIG. 4B
PRIOR ART

FIG. 6A
FIG. 6B
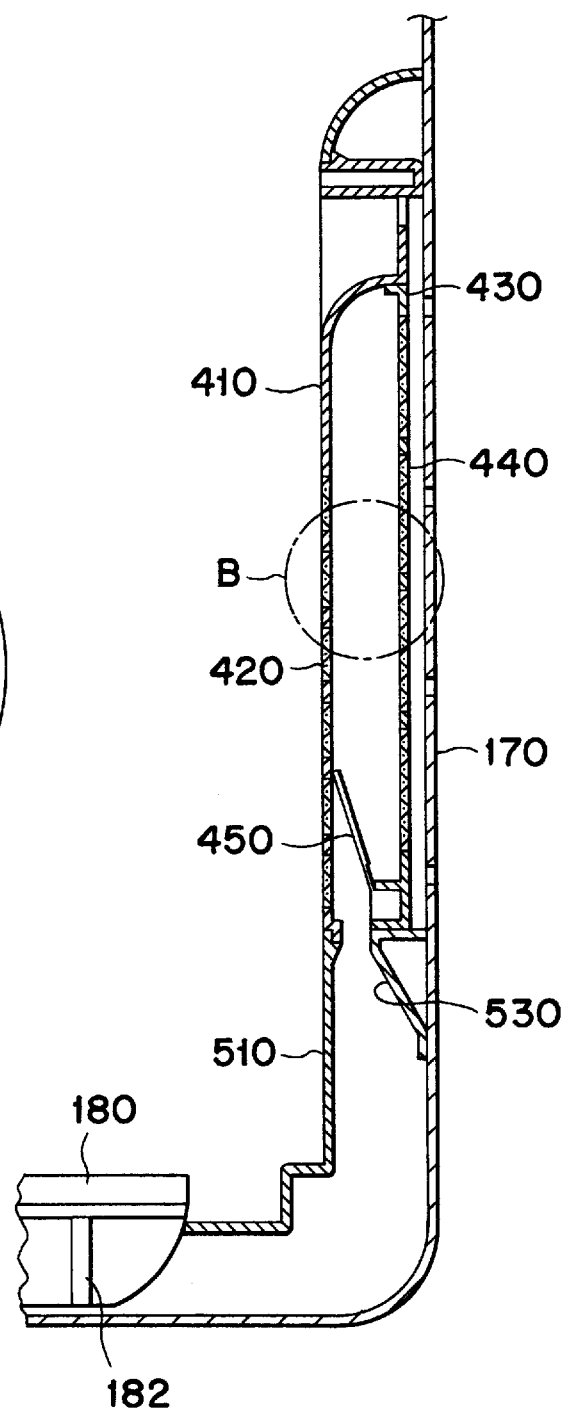
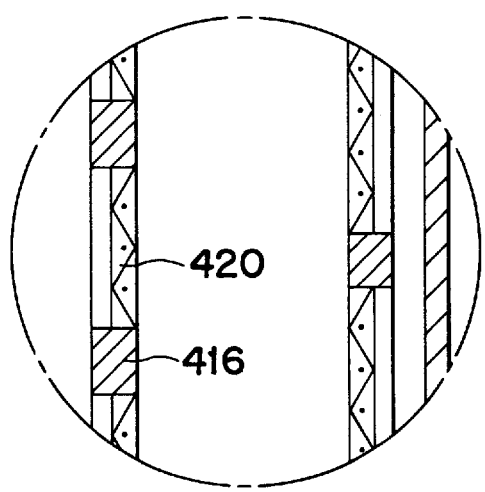

FILTER FOR A WASHING MACHINE

RELATED INVENTION

This invention is related to inventions disclosed in commonly filed U.S. Ser. Nos. 09/028,523, 09/028,526, 09/283,354, 09/028,666, and 09/028,670, the disclosures of which are incorporated by reference herein.

BACKGROUND OF THE INVENTION

1. Field of the Invention

The present invention relates to a washing machine, and more particularly to a filter for a washing machine for filtering foreign matters such as fluff from washing water.

2. Description of the Prior Art

FIG. 1 illustrates a conventional washing machine. Referring to FIG. 1, in the conventional washing machine, a washing tub 120 is suspended by a suspension 130 into inside of a case 110.

A dehydrating tub 170 and a pulsator (or an agitator; hereinafter refer to "a pulsator") 180 selectively driven by a clutch assembly 160 which is connected to a motor 150 by means of a belt 140, are disposed in the inner side of washing tub 120.

An impeller 182 as a pump is integrally formed to the lower side of pulsator 180, and a filter 190 is provided around the upper end of dehydrating tub 170. A guide portion 172 for guiding the washing water pumped by impeller 182 toward filter 190 is formed between impeller 182 and filter 190.

In the washing machine constructed as above, once pulsator 180 is rotated by motor 150 and clutch assembly 160 during a washing or rinsing cycle, the washing water pumped by impeller 182 at the lower portion of pulsator 180 is guided to filter 190 along guide portion 172 to be dropped into the interior of dehydrating tub 170 via filter 190. During this process, foreign matters intermingled in the washing water are filtered by filter 190.

However, according to the conventional washing machine constructed as above, filter 190 is arranged around the upper end of dehydrating tub 170. For this reason, when a small amount of articles is washed in a small quantity of cleaning water, the washing water cannot reach filter 190. That is, the foreign matters intermingled in the washing water cannot be sufficiently filtered by filter 190 to lower washing efficiency.

FIGS. 2 to 4 show other example of a filter for a washing machine proposed to overcome the above described problems as a example.

As illustrated, the filter for a washing machine is attached to the inner lower portion of dehydrating tub 170, which includes a filter case 300 and a pocket type filter 200 for filtering fluff by being inserted into filter case 300.

Filter case 300 is attached to the inner lower portion of dehydrating tub 170 to form a predetermined space with dehydrating tub 170, which includes an attachment portion 310 for attaching itself onto dehydrating tub 170, a front plane portion 320 formed with a plurality of discharging holes 322 and inserting guide portions 330 formed to both rear sides of front plane portion 320 while having the upper portion opened.

Pocket type filter 200 includes a front panel 210, a rear panel 230 and a check valve 250. Front panel 210 and rear panel 230 are coupled to be opened/closed by a hinge shaft 232 formed to rear panel 230, and attached with mesh nets 220 and 240 for filtering the fluff. Check valve 250 for opening/closing the space between front panel 210 and rear panel 230, is fixed to the lower side of rear panel 230 and made of a material such as a rubber.

Pocket type filter 200 as described above is inserted into the interior of the space between filter case 300 and dehydrating tub 170 by being slidably moved along inserting guide portions 330 from the upper portion of inserting guide portions 330 of filter case 300.

According to the filter as described above, the washing water pumped by impeller 182 flows into pocket type filter 200 via the space between dehydrating tub 170 and filter case 300 during the washing or rinsing cycle. Check valve 250 is upwardly pushed away by means of the washing water thereby the washing water is introduced into the interior of pocket type filter 200.

The washing water introduced into inside of pocket type filter 200 is discharged into dehydrating tub 170 via mesh nets 220 and 240 of front panel 210 and rear panel 230. At this time, the fluff within the washing water is filtered by mesh nets 220 and 240 attached to the front panel 210 and rear panel 230. Also, the washing water exhausted out of pocket type filter 200 is discharged into the interior of dehydrating tub 170 via discharging holes 322 formed in front plane portion 320 of filter case 300.

Under the state that the rotation of a pulsator is stopped after completing the washing or rinsing cycle, check valve 250 returns to its original position by means of gravity. Consequently, the filtered fluff is accumulated into the interior of pocket type filter 200 without getting away from pocket type filter 200.

The fluff accumulated on the interior of pocket type filter 200 is closely attached toward rear panel 230 due to a centrifugal force exerting upon the fluff by dehydrating tub 170 which is rotated at high speed during a dehydrating cycle. By doing so, the washing water pumped by impeller 182 can be easily introduced into pocket type filter 200 during the initial period of the next washing or rinsing cycle.

Meanwhile, as the amount of the fluff accumulated within pocket type filter 200 is increased, user grasps the upper portion of the pocket type filter and moved pocket type filter 200 in upper direction along inserting guide 230 of the filter case so as to separating pocket type filter 200 from the space between filter case 300 and dehydrating tub 170, then opens pocket type filter 200 and removes the fluff.

However, according to the other example, there are drawbacks as followed.

The fluff filtered by mesh nets 220 and 240 are attached to mesh nets 220 and 240 when the washing water passes through mesh nets 220 and 240 of front panel 210 and rear panel 230, and the attached fluff is separated from the mesh nets by a stream of the washing water which upwardly pushes check valve 250 away and is introduced into the interior of pocket type filter 200.

However, as shown in FIG. 4B, since mesh nets 220 and 240 are attached along the outside surface of reinforcement members 216 ad 236 of front panel 210 and rear panel 230, reinforcement members 216 and 236 are protruded to the inner side of pocket type filter 200. Thus, reinforcement members 216 and 236 obstructs the stream of the washing water to be introduced toward mesh nets 220 and 240 beyond reinforcement members 216 and 236. Meanwhile, since pumping power is weak when a small quantity of the laundry is washing, the stream of the washing water introduced into the interior of pocket type filter 200 does not have enough to separate the fluff from mesh nets 220 and 240.

By doing so, if the fluff filtered by mesh nets 220 and 240 are attached thereto the stream of the washing is obstructed so that deteriorates the efficiency of the filter and the washing machine.

SUMMARY OF THE INVENTION

Therefore, it is an object of the present invention to provide a filter for a washing machine capable of preventing a fluff from attaching to a mesh net and making washing water easily flow.

To achieve the object, the present invention provides a filter case attached to an inner lower portion of a dehydrating tub of the washing machine for forming a predetermined space with the dehydrating tub, including an attachment portion for being attached to the dehydrating tub and a filter receiving portion formed with an opening portion, and a pocket type filter including a front panel attached with a mesh net to one side thereof for filtering fluff intermingled in the washing water, a rear panel provided with hinge shafts at lower portions thereof for forming a predetermined space with the front panel by being coupled to the front panel by the hinge shafts to be opened/closed while being attached with a mesh net for filtering the fluff intermingled in the washing water to one side thereof, and a check valve fixed to the lower side of the rear panel for confining the flow of the washing water introduced into the space between the front panel and the rear panel, the pocket type filter being inserted into the filter receiving portion, the mesh net attached to the front panel being integrally abutted to an inner surface of reinforcement members of the front panel for supporting the mesh net.

According to the present invention, the filter case preferably includes a washing water accelerating part for increasing flow speed of the washing water introduced into the interior of the pocket type filter which is received into the filter receiving portion. The washing water accelerating part decreases a sectional area of the space defined by the filter case and the dehydrating tub toward the filter receiving portion.

According to the present invention as described above, since the mesh net attached to the front panel is abutted to inner surface of reinforcement members, the reinforcement members does not obstruct the flow of the washing water introduced into the interior of the pocket type filter. Thus, the fluff attached to the mesh net is separated therefrom by the washing water introduced into the interior of the pocket type filter. Moreover, since the flow speed of the washing water introduced into the pocket type filter is increased by the washing water accelerating part which is formed to decrease a sectional area of the space between the filter case and the dehydrating tub, the fluff attached to the mesh net is more easily separated therefrom.

Accordingly, the attachment of the fluff on the mesh net is prevented and the washing water easily flows so that the efficiencies of the filter of a washing machine are enhanced.

BRIEF DESCRIPTION OF THE DRAWINGS

The above objects and other advantages of the present invention will become more apparent by describing in detail preferred embodiments thereof with reference to the attached drawings in which:

FIG. 3 is an exploded perspective view of the filter shown in FIG. 2;

FIG. 4A ia detailed sectional view showing the portion shown in FIG. 2 where the filter for a washing machine is mounted;

FIG. 4B is an enlarged sectional view of portion A in FIG. 4A;

FIG. 6A is a sectional view showing a state that the filter for a washing machine in FIG. 5 attached to a washing machine; and FIG. 6B is an enlarged sectional view of portion B in FIG. 6A.

DETAILED DESCRIPTION OF THE PREFERRED EMBODIMENTS

Figure 1:
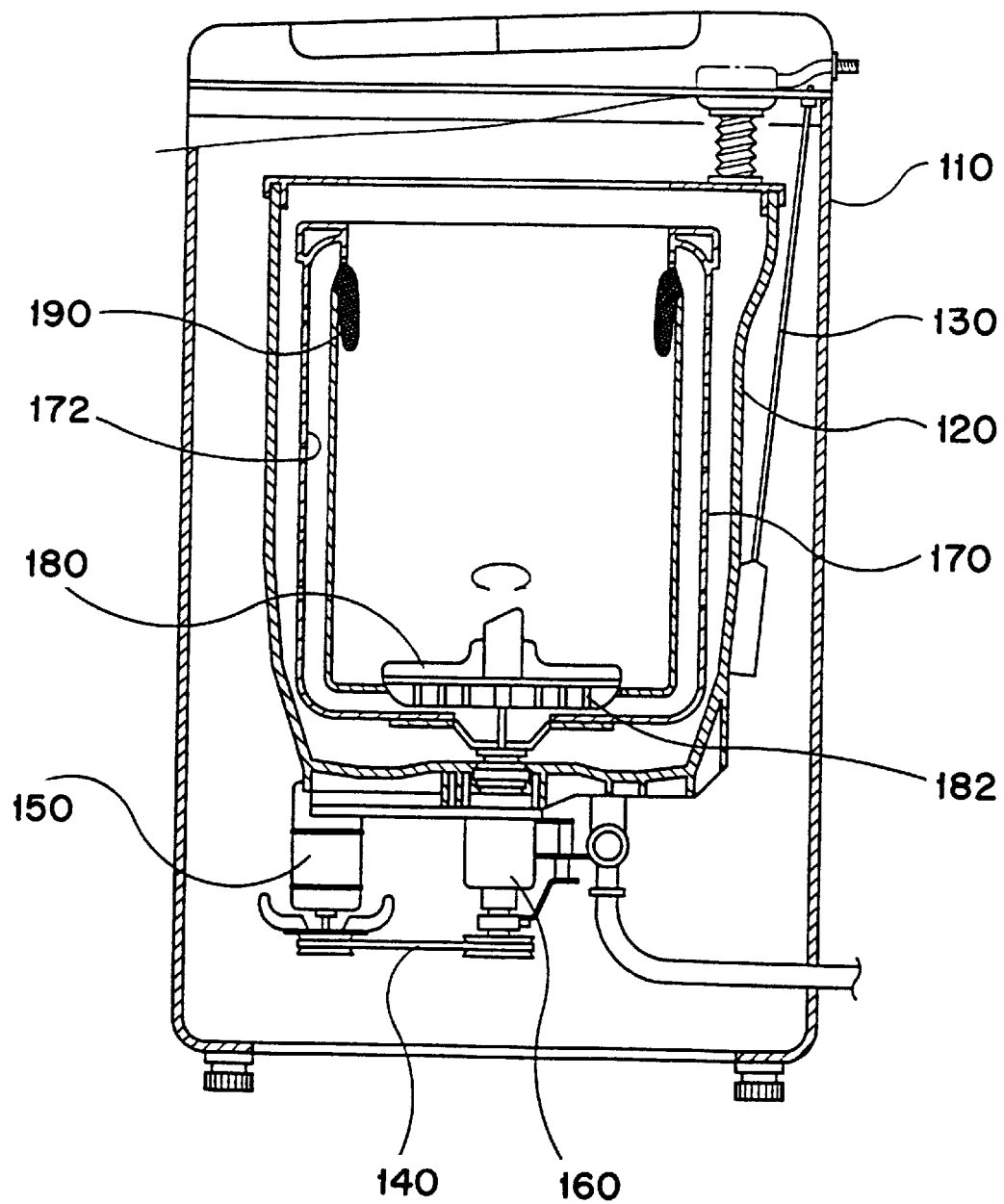
FIG. 1 is a sectional view showing a general full automatic washing machine having a filter.
Figure 2:
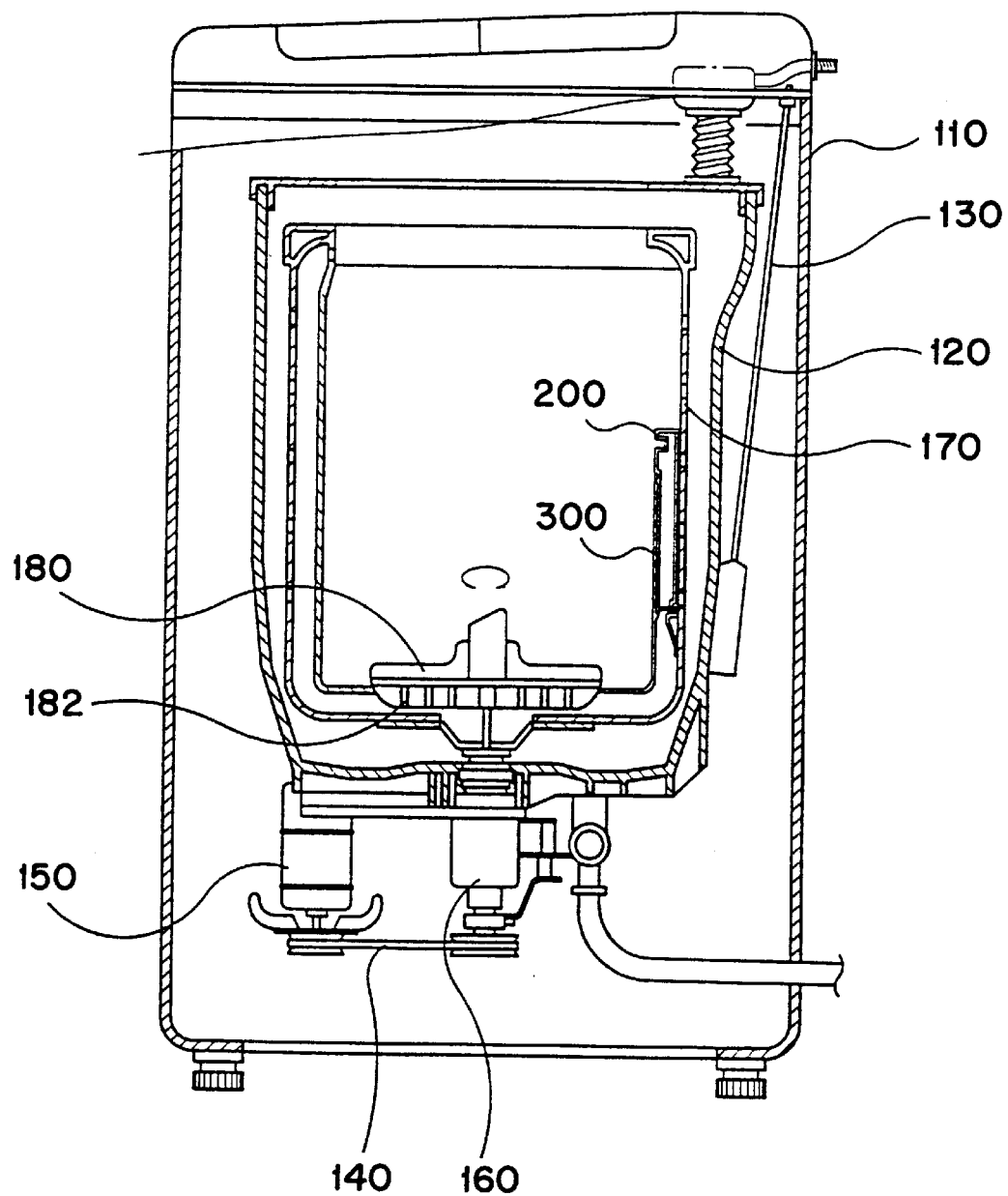
FIG. 2 is a sectional view showing other general full automatic washing machine having a filter.
Figure 5:
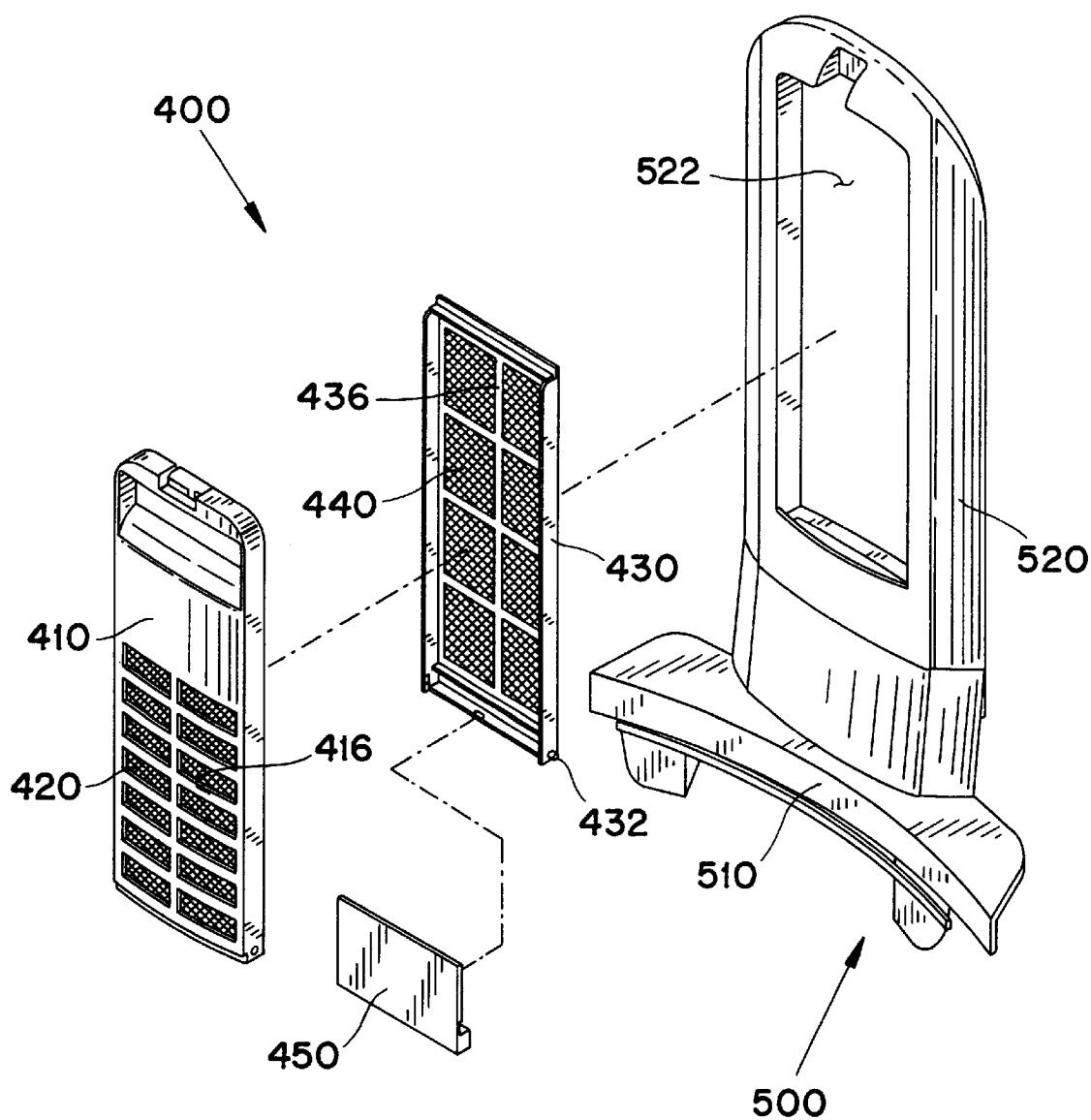
FIG. 5 is an exploded perspective view showing a filter for a washing machine according to the present invention.

A filter according to a preferred embodiment of the present invention is shown in FIGS. 5 to 6B.

As illustrated, a filter for a washing machine according to the present invention is attached to the inner lower portion of a dehydrating tub 170, which includes a filter case 500 and a pocket type filter 400 for filtering fluff by being inserted into filter case 500.

Filter case 500 includes an attachment portion 510 for attaching itself onto dehydrating tub 170, a filter receiving portion 520 formed with an opening 522 into which pocket type filter 400 is inserted from preceding side thereof, and a washing water accelerating part 530 for accelerating an introducing speed of the washing water. The washing water is introduced into the interior of pocket type filter 400 via a space defined by washing water accelerating part 530 and dehydrating tub 170.

Washing water accelerating part 530 is formed at lower rear side of filter receiving portion 520. The sectional area of the space defined by filter case 500 and dehydrating tub 170 is gradually decreased to one second to one fourth times of original sectional area of the space toward filter receiving portion 520 by washing water accelerating part 530.

Pocket type filter 400 includes a front panel 410, a rear panel 430 and a check valve 450. Front panel 410 and rear panel 430 are coupled to be opened/closed by a hinge shaft 432 formed to rear panel 430, and attached with mesh nets 420 and 440 for filtering the fluff respectively. Mesh nets 420 is abutted on the inner surface of front panel 410 by such ways of insert molding and heat pressing.

Check valve 450 for opening/closing the space between front panel 410 and rear panel 430, is fixed to the lower side of rear panel 430 and made of a material such as a rubber.

Pocket type filter 400 is inserted into opening 522 from preceding side of filter case 500 and then accommodated in filter receiving portion 520.

Since the operation of the filter for a washing machine according to the present invention is same to the operation of the other example of the prior art, the description of the operation is abbreviated.

According to the present invention as described above, since the mesh net attached to front panel 410 is abutted to inner surface of reinforcement member 416, any portion does not protrude above the inner surface of reinforcement member 416. Thus the washing water is introduced into the interior of pocket type filter 400 via the space between filter case 500 and dehydrating tub 170, flows along mesh net 420 there is no portion, and separates the fluff on mesh net 420. In addition, the washing water is introduced into the interior of pocket type filter 400 in a state that the flow speed of the washing water is increased so that the fluff on mesh net 420 is easily separated from mesh net 420.

Accordingly, the attachment of the fluff on the mesh net is prevented and the washing water easily flows so that the efficiencies of the filter of a washing machine are enhanced.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A filter apparatus for a washing machine comprising:

a filter case attached to an inner lower portion of a dehydrating tub of the washing machine for forming a predetermined space with the dehydrating tub, including an attachment portion for being attached to the dehydrating tub and a filter receiving portion formed with an opening portion; and a pocket filter including a front panel attached with a mesh net to one side thereof for filtering fluff intermingled in the washing water, a rear panel provided with hinge shafts at lower portions thereof for forming a predetermined space with the front panel by being coupled to the front panel by the hinge shafts for opening and/or closing said pocket filter, said rear panel further including a mesh net for filtering the fluff intermingled in the washing water to one side thereof, and a check valve fixed to the lower side of the rear panel for confining the flow of the washing water introduced into the space between the front panel and the rear panel, the pocket filter being inserted into the filter receiving portion, the mesh net attached to the front panel being integrally abutted to an inner surface of reinforcement members of the front panel for supporting the mesh net.

2. The filter apparatus for a washing machine as claimed in claim 1, wherein the filter case further includes a washing water accelerating part for increasing flow speed of the washing water introduced into the interior of the pocket type filter which is received into the filter receiving portion.

3. The filter apparatus for a washing machine as claimed in claim 2, wherein the washing water accelerating part decreases a sectional area of the space defined by the filter case and the dehydrating tub one forth to one half of the sectional area prior to said washing water acceleration part.

\* \* \* \* \*